Sept. 2, 1941.   G. E. KING ET AL   2,254,897
MOTOR CONTROL SYSTEM
Filed Nov. 29, 1939
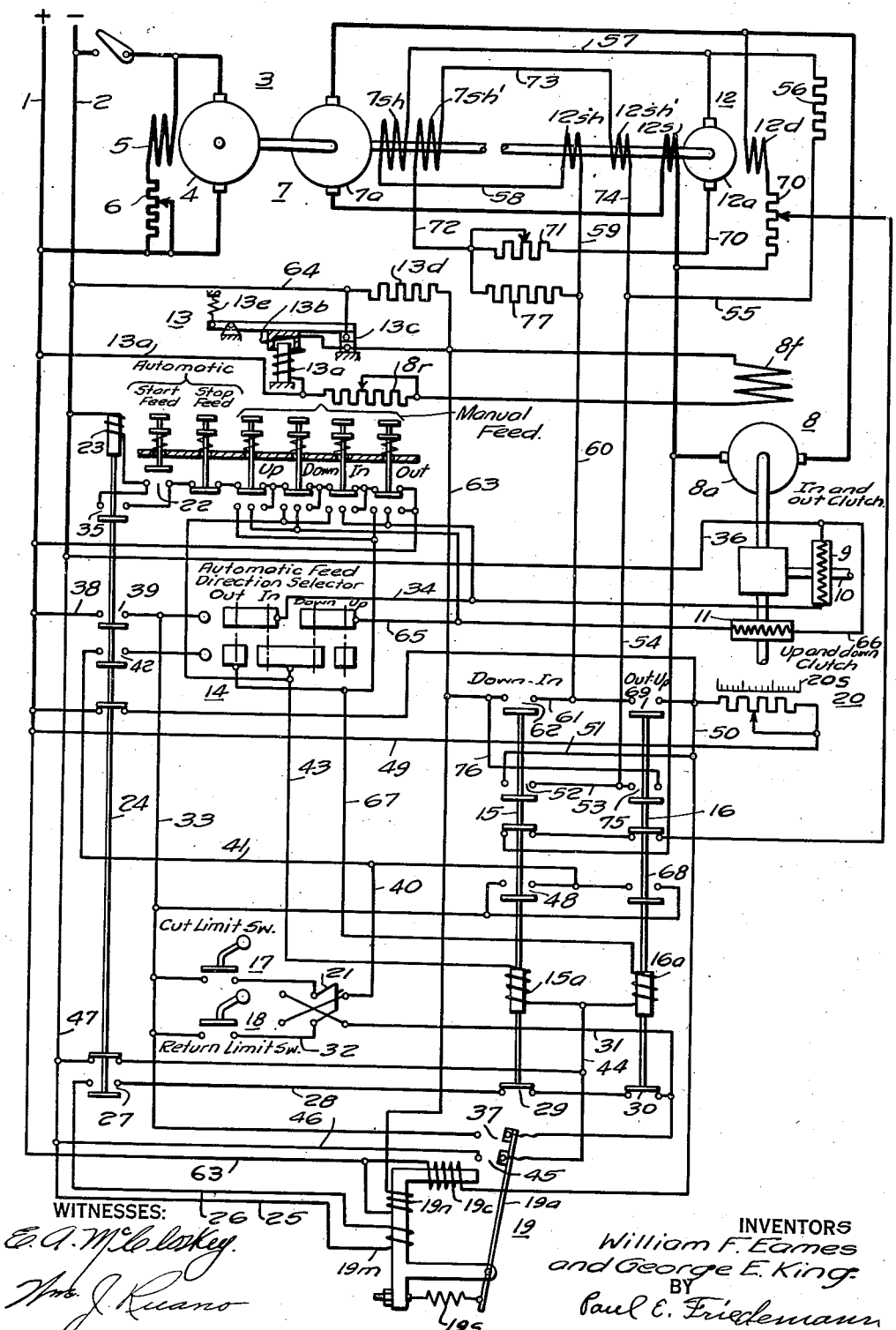
WITNESSES:
INVENTORS
William F. Eames
and George E. King.
BY
Paul E. Friedemann
ATTORNEY Patented Sept. 2, 1941

2,254,897

UNITED STATES PATENT OFFICE 2,254,897

MOTOR CONTROL SYSTEM

George E. King, Wilkinsburg, Pa., and William F. Eames, Westfield, N. J., assignors to Westinghouse Electric & Manufacturing Company, East Pittsburgh, Pa., a corporation of Pennsylvania Application November 29, 1939, Serial No. 306,668

17 Claims. (Cl. 90—49)

Our invention relates generally to devices for controlling the operating characteristics of motor-driven machines, and it has special relation to a control system for controlling within preselected limits the movement of elements of motor-driven machines.

More particularly, our invention relates to a control system for regulating the feeding rate of cutting tools, for example, in machines such as planers, millers, grinders, screwdown mechanisms, rolling mills, shears, saws, or any other machine where a feeding motion or a retrieving motion of a machine element in a given direction is to take place periodically in definite increments or decrements of distance.

Feeding mechanisms and their adjustments in prior devices are unnecessarily complicated mechanically and are more expensive than necessary. The usual device is one which measures, through a system of gears and screws, the actual travel of the tool head. This requires a complicated system of gears and cams and the location of the feed adjustment in what may at times be a somewhat inaccessible place. The accuracy of the measurement is fairly good, but varies with the braking characteristic of the drive motor under different friction loads and directions of travel. Small increments of feed are made erratic by the fact that the motor does not have time to reach full speed, and the top speed that is reached varies with operating conditions.

An object of our invention is to provide a Ward-Leonard control system to feeding mechanisms, such as a planer tool feeding mechanism, including a regulating means for maintaining the feed motor accelerating rate substantially constant irrespective of changes in load encountered by the cutting tool.

Another object of our invention is to provide a timing device in a tool feeding mechanism, such as in a planer machine, which is adjustable so as to give fine increment low-feed rates or coarse increment high-feed rates by the simultaneous change of the timing device and feed motor speed.

Another object of our invention is to provide a system which can be readily adapted to any machine without any appreciable modification of the machine, and in which a single adjustment is required to cover the complete range of feeds, and in which the adjusting device can give increments as fine as desired and can be located in any readily accessible place.

Another object of our invention is to provide a system which can be readily adapted to either an alternating-current or direct-current system having simple and standard parts which handle only small currents and which have an unusually long life, requiring very little maintenance, but which is highly reliable in operation.

Other objects and advantages will become more apparent from a study of the following specification when considered in conjunction with the accompanying drawing, in which the single figure is a schematic showing of a planer including a control system in accordance with our invention.

Referring more particularly to the single figure, numerals 1 and 2 denote, respectively, the positive (+) and negative (—) buses of a direct-current supply source, across which are connected a direct-current driving motor 3 including an armature 4, and a shunt field winding 5 having a variable resistor or rheostat 6. The driving motor 3, together with a direct-current generator 7 and a direct-current feed motor 8, comprise a Ward-Leonard system. The armature 7a of generator 7 is mechanically coupled to the armature 4 of the driving motor. The armature 8a of the feed motor 8 is mechanically coupled to a clutch 9 which provides in-and-out movement of a tool (not shown) which is connected to a shaft 10, whereas a clutch 11, which is also connected to the feed motor armature 8a, provides for up-and-down movement of the same tool. Clutches 9 and 11 are somewhat schematically shown in that they are the standard clutches such as used in conventionel planers having the conventional cross-rail for carrying the tool head, which is driven by a feed motor, for effecting a feeding operation of the tool head either up or down or for effecting a feeding operation of the tool head to the right or left, or in-and-out, as desired. Such conventional type of planer feeding tool is shown and described more completely in the King Patent No. 2,100,745, issued November 30, 1937, and its further description is not deemed necessary, particularly since the special form of tool feeding mechanism does not form any part of our invention.

It is understood that a planer platen is reciprocated by another motor. In the forward or usual cut direction the tool operates on a work piece on the platen with a cutting operation, whereas on the return stroke, no cutting takes place. On the next forward stroke of the platen, the tool, to make a cut, must be moved in such a direction that it will not traverse the same path. The means for preselecting the rate of shifting of the tool to the right or left, or up or down, as desired, will presently be described.

The generator 7 includes a pair of split shunt field windings 7sh and 7sh'. In addition to the Ward-Leonard system, a regulator generator 12 is provided for the purpose of making the feed motor 8 operate at the particular speed selected by the motor speed adjusting rheostat 20 irrespective of changes in supply voltage, changes in load or changes in ambient temperature, and also for providing constant acceleration for any speed setting of the feed motor. Regulator 12 has an armature 12a which is mechanically coupled to the armature 4 of the motor 3, and has a series field 12s responsive to current supplied to the feed motor which field is connected in series with the generator and feed motor armatures. The regulator also has a pair of split shunt field windings 12sh and 12sh' responsive to the excitation currents of the shunt field windings 7sh and 7sh', respectively, and a differential field winding 12d for the purpose of making the correction applied by the regulator generator proportional to the departure of the speed of the feed motor from the desired speed corresponding to the setting of rheostat 20. The feed motor has a field winding 8f which is so energized to maintain a constant speed irrespective of fluctuations in the voltage of the supply source 1—2. This constant speed is provided by a voltage regulator 13 of any suitable type, for example, of the well known intermittent contact type, comprising a fixed coil 13a and a movable coil 13b which surround telescoping armatures having a constant air gap. As the voltage of the supply source tends to increase, the attraction between the two coils 13a and 13b is increased, thereby closing the contact members 13c and shunting the resistor 13d, and thereby providing a closed path from the positive bus through a variable resistor 8r, field winding 8f and through contact members 13c to the negative bus, thereby increasing the field strength of the feed motor tending to decrease the speed thereof. On the other hand, if the voltage should decrease, coils 13a and 13b will move apart under the influence of the biasing spring 13e, thereby opening contact members 13c and inserting resistor 13d in series with the motor field winding 8f, thereby weakening the field and increasing the speed of the feed motor 8. In this manner, throuh the periodic fluttering of the contact members 13c, a constant voltage across field winding 8f will be maintained, thereby operating the feed motor 8 and the cutting tool at a constant speed irrespective of fluctuations of the supply voltage.

The particular voltage regulator does not form a part of our invention, and for a more complete description of the theory thereof, reference is hereby made to the Schaelchlin Patent No. 1,820,712, issued August 25, 1931.

A feed direction selector switch 14 is also provided for predetermining the direction of feed for automatic operation. For manual operation, a plurality of push buttons marked "up," "down," "in," and "out," respectively, are provided for initiating positioning of the tool, such as when initially setting up the work. A relay 15 is associated with the "down" and "in" movements of the feeding tool, whereas a relay 16 is associated with the "out" and "up" movements of the feeding tool. A cut limit switch 17, a return limit switch 18, a timing relay 19, and a motor feed adjusting rheostat 20 are also provided.

In addition to the circuits already discussed, a circuit is also provided for the neutralizing winding 19n of the timing relay 19 from buses 1 and 2 through conductor 63. The operation of all the elements will be best understood by a description of the operation of the device, which is as follows:

In the operation of the device, assume that the attendant sets the automatic feed direction selector switch 14 on the "in" position for feeding the cutting tool inwardly, and that the double-throw switch 21 is thrown to the right or "cut" position—that is, to preselect feeding of the cutting tool so as to occur at the end of the cut stroke—and assume that the "start-feed" pushbutton has been closed by depressing it against the action of its biasing spring, thereby closing contact members 22, then a circuit is completed through the actuating coil 23 of relay 24, which circuit includes contact members 22, "stop-feed" pushbutton contacts and the "up," "down," "in" and "out" pushbutton contacts. Relay 24 is thus actuated, thereby effecting closing of contact members 35 which bridge contact members 22, thereby maintaining coil 23 energized after release of the "start-feed" pushbutton. As the planer carriage (not shown) reaches the end of the "return" stroke, the return limit switch 18 closes, thereby effecting energization of the main timing relay coil 19m. The circuit for coil 19m may be traced from the negative bus 2 to conductor 25, main or pick-up coil 19m, conductor 26, contact members 27, conductor 28, contact members 29 and 30, conductor 31, the right-hand contact members of double-throw switch 21, conductor 32, limit switch 18, conductor 33, closed contact members 39, conductor 38 to the positive bus 1. As coil 19m becomes energized, it attracts armature 19a, thereby closing contact members 37 which bridge the return limit switch 18, thereby completing a holding circuit to maintain coil 19m energized even after opening of limit switch 18.

A circuit is also established from the bus 1 through conductor 38, contact members 39, the "in" segment of the switch 14, conductor 34, the coil for electromagnetic clutch 9 and conductor 36 to the bus 2.

At the end of the cut stroke, the cut limit switch 17 closes, thereby completing an energizing circuit through actuating coil 15a of the "down-in" relay 15, which circuit may be traced from the positively energized conductor 33, through cut limit switch 17, conductors 40 and 41, contact members 42, the "in" contact segment of selector switch 14, conductor 43, actuating coil 15a, conductor 44, contact members 45, conductors 46 to the negative bus terminal 2.

Since the "in-out" clutch 9 has been previously energized, the feed motor is set to feed inwardly and relay 15 is locked in through its holding contact members 48 which bridge the limit switch 17. At the same time contact members 29 of relay 15 open, thereby interrupting the circuit through the main or pick-up coil 19m, thus permitting relay 19 to "time out." The time necessary for relay 19 to "time out"—that is, for armature 19a to open contact members 37 and 45 under the action of spring 19s—is dependent upon the voltage applied across the calibrating coil 19c of relay 19, which voltage is adjustable by variable resistor 20 connected in parallel therewith across the direct-current supply source.

The function of the variable resistor is twofold: first, to vary the time constant of relay 19, and second, due to its series circuit relationship, to change the available voltage across the generator and regulator shunt fields, which in turn changes the maximum available speed of the feed motor 8. Such series circuit may be traced from the bus 1 through conductor 49, variable resistor 20, conductors 50 and 51, contact members 52, conductors 53 and 54 thence through two parallel paths, one going through conductor 55, resistor 56, conductor 57, generator shunt field winding 7sh, conductor 58, regulator shunt field winding 12sh, conductors 59 and 60, and the other parallel path going through field winding 12sh', conductor 73, field winding 7sh', conductor 72, resistor 71 joining the first parallel path, then through conductor 61, contact members 62, conductor 63 through either of the parallel paths 13d or 13c, conductor 64 to the negative bus 2. It will be noted that the parallel connection of the field windings in the aforementioned parallel paths results in faster building up of breaking down of the flux in the generator field, hence faster response of the feed motor. As the generator shunt field winding 7sh becomes energized, the feed motor starts to turn, thereby feeding the cutting tool. When the time relay 19 drops out after a predetermined time interval, contact members 45 are opened, thereby interrupting the circuit through actuating coil 15a and deenergizing relay 15, thereby in turn deenergizing the shunt field winding of generator 7. Due to the opening of contact members 52 and 62 of relay 15, the feed motor 8 thus stops even though the field winding 8f always remains energized. The planer in the meantime has started another return movement and the sequence will repeat. The effects of residual voltage in the generator are eliminated by the regulator. A short-circuit around a portion of the resistance 70 that is in series with the regulator differential field winding 12d across the armature circuit provides a means for determining how quickly the generator voltage is reduced to zero.

If it were desired to effect feeding of the cutting tool at the end of the "return" stroke instead of at the end of the "cut" stroke, the reversing switch 21 would be thrown to its left or "return" position, thereby reversing the effects of the cut limit switch 17 and return limit switch 18, that is to say, the feeding of the cutting tool will now occur at the end of the "return" stroke while the set-up circuit, that is, energization of the main coil 19m of the timing relay and of the operating coil of clutch 9, will occur at the end of the "cut" stroke. This will appear more clearly from the following analysis.

Let it be assumed, not only that switch 21 is at the left or "return" position, but that selector switch 14 has been placed in the "up" position so as to effect upward feeding of the cutting tool. Upon depression of the "start feed" push button relay 24 will become energized and remain in its energized position by virtue of holding contact members 35 as explained before. As the planer carriage reaches the end of the "cut" stroke, the cut limit switch 17 closes and effects energization of the main coil 19m of timing relay 19. The circuit may be traced from the bus 2 through conductor 25, main coil 19m, conductor 26, contact members 27, conductor 28, contact members 29 and 30, conductor 31, the left-hand contacts of the double-throw switch 21, cut limit switch 17 to the positively energized conductor 33. The clutch will be energized from conductor 33 through the "up" selector switch segment conductor 65, the actuating coil of clutch 11, conductors 66 and 36 to the bus 2. Although clutch 11 is actuated, no feeding will occur since the field of generator 7 is not yet deenergized. As coil 19m becomes energized it attracts armature 19a, thereby closing contact members 37 which bridge the "cut limit switch" 17, thereby completing a holding circuit to maintain coil 19m energized even after opening of limit switch 18.

At the end of the "return" stroke, the "return limit switch" 18 closes, thereby completing an energizing circuit through actuating coil of the "out-up" relay 16 which may be traced from the positive conductor 33, through "return" limit switch 17, conductors 40 and 41, contact members 42, the "up" segment of selector switch 14, conductor 67, actuating coil 16a, conductor 44, contact members 45, conductors 46 and 47 to the bus 2. Since the "up and out" clutch 11 has been previously energized, the feed motor is set to feed upwardly and relay 16 is locked in through its holding contact members 68, which bridge limit switch 18. At the same time, contact members 30 of relay 16 open, thereby interrupting a circuit through the main coil 19m, thus permitting relay 19 to "time out." The completed circuit for effecting energization of the generator field winding, thus to effect operation of the feed motor, may be traced from the positive bus terminal 1 through conductor 49, variable resistor 20, contact members 69 of relay 16, conductor 60, thence through two parallel paths, one going through the regulator shunt field winding 12sh, conductor 59, generator shunt field winding 7sh, conductor 57, resistor 56, conductor 55 to conductor 54, and the other parallel circuit going through resistor 77, conductor 72, field winding 7sh', conductor 73, field winding 12sh' to conductors 74 and 54, joining the first parallel path, thence through contact member 75 of relay 16, conductors 76 and 63, thence through either contact members 13c or resistor 13d to conductor 64 and thence to the negative bus terminal 2. Since the generator shunt field windings 7sh and 7sh' are energized, the feed motor starts to turn, thereby feeding the cutting tool. When the time relay drops out after a predetermined time interval (depending on the adjustment of resistor 20), contact members 45 are opened, thereby interrupting the circuit through actuating coil 16a of relay 16, thus deenergizing generator 7 (by interrupting the field circuit) and causing stopping of the feed motor 8. The planer in the meantime has started another "cut" movement and the above-described sequence will repeat.

It will be observed that by changing the value of variable resistor 20, both the time constant of relay 19 and the speed of feed motor 8 are varied simultaneously, thereby giving fine increment, low-feed rates, or coarse increment, high-feed rates. As indicating scale 20s is associated with resistor 20 and may be calibrated to indicate the value of the feed increments. Adjustment of variable resistor 20 accurately determines the speed of the feed motor 8, and inasmuch as it also adjusts the time constant of relay 19, it will determine how long the feed motor 8 shall advance the feed of the cutting tool.

In accordance with the above-described system, a variable voltage speed range of 100 to 1 is readily possible. Inasmuch as the time constant of the relay 19 may readily vary over a range, say, between ½ second to 1½ seconds, this gives an additional factor of 3, making the range 300 to 1, or a feed range of .005 to 1.5 inches. This could readily be extended to a maximum of 3 inches feed by a relay of ½ to 3 seconds time adjustment. As the speed is varied, the short time is used with small feeds and gives a fine gradation at low feeds and a coarse gradation at large feeds for the same revolution per minute increments in the speed of the feed motor. By the use of a Ward-Leonard system, together with the regulator 12 and the particular connection of the various field windings, the accelerating rate of the feed motor is maintained at a constant value irrespective of changes in load of the cutting tool in its course of cutting of various work materials. Our invention is not directed to this scheme of maintaining constant acceleration per se, but is directed to the combination of such constant acceleration system together with the other elements described hereinbefore. A detailed explanation of the theory of operation of the constant acceleration scheme shown, including a balanced bridge circuit which involves the respective field windings and resistors is contained in an application of G. E. King et al., Serial No. 198,884, filed March 30, 1938, entitled "Variable voltage control system."

In previous devices, the feed motor speed would change as a result of voltage variations. This is overcome in accordance with our present invention. The direct-current drive, as shown on the drawing, can have a field characteristic such that a drop in voltage will weaken the field and weaken the armature, so that there is practically no change in motor speed. The feed motor can have a saturated field with series resistance 8r across a regulated voltage supply, so that practically no variation will occur in the speed characteristic of this motor. Any changes in the generator field or voltage characteristic will be neutralized by the regulator connection used with it.

Instead of providing a direct-current driving motor 3, it is possible to provide an alternating-current motor which is excited by an alternating-current source of supply, and which motor has an exciter mounted thereon for supplying the planer control system and the feed mechanism. In this situation, the voltage regulator 13 may be omitted.

In accordance with our system described above, only field currents and relay currents are manipulated in the feed control, thereby permitting the use of small relays of reliable design and minimum upkeep. Sudden changes of torque on the feed motor are avoided in our control scheme so that the speed changes smoothly but quickly.

We are, of course, aware that others, particularly after having had the benefit of the teachings of our invention, may devise other devices embodying our invention, and we, therefore, do not wish to be limited to the specific showing made in the drawing and the descriptive disclosure hereinbefore made, but wish to be limited only by the scope of the appended claims and such prior art that may be pertinent.

We claim as our invention:

1. In a system of control for controlling the distance of travel of a motor-operated machine element operating on a work piece, a Ward-Leonard system including a motor-generator set and a feed motor for driving the machine element, a coupling for mechanically connecting said machine element to said feed motor, switching means for starting and stopping said feed motor, a second coupling for mechanically connecting said machine element to said feed motor, and electrical control means including an electromagnetically operated relay having a variable time element for preselecting the distance of travel of said machine element.

2. In a system of control for controlling the distance of travel of a motor-operated machine element operating on a work piece, a Ward-Leonard system including a motor-generator set and a feed motor for driving the machine element, a coupling for mechanically connecting said machine element to said feed motor, switching means for starting and stopping said feed motor, a second coupling for mechanically connecting said machine element to said feed motor, electrical control means for preselecting the distance of travel of said machine element, said last-mentioned means including a regulator for maintaining a "straight line" acceleration characteristic of said feed motor irrespective of the amount of load on said machine element, and a time delay switching means and a single adjusting means for simultaneously adjusting the time constant of said time delay switching means and the field strength of said generator.

3. In a system of control for controlling the distance of travel of a motor-operated machine element operating on a work piece, a Ward-Leonard system including a motor-generator set and a feed motor for driving the machine element, a coupling for mechanically connecting said machine element to said feed motor, switching means for starting and stopping said feed motor, a second coupling for mechanically connecting said machine element to said feed motor, electrical control means for preselecting the distance of travel of said machine element, said last-mentioned means including a regulator for maintaining a "straight line" acceleration characteristic of said feed motor irrespective of the amount of load on said machine element, and a time delay switching means for controlling the duration of the operating cycle of said feed motor, a variable resistor connected in series with the armature of said regulator and the field winding of said generator for varying the speed of said feeding motor and simultaneously adjusting the time constant of said time delay switching means.

4. In a control system, in combination, an electric motor, a machine element comprising a cutting tool disposed to operate on a work piece, coupling means between said element and said motor, a source of electrical energy for the control system and the motor, and electrical control means for preselecting the distance of travel of said cutting tool including a regulator for maintaining a "straight line" acceleration characteristic of said motor, a time delay switching means and a variable resistor for simultaneously adjusting the speed of said motor and the time constant of said time delay switching means thereby preselecting the angle through which said motor rotates.

5. In a control system for a planer, in combination, an electric feed motor having an armature, a source of electrical energy for the control system, a cutting tool, means for connecting said feed motor to the source of energy and the tool to the motor armature, and feed control means adapted to disconnect the tool from the motor armature when the motor has assumed a predetermined angular position relative to its initial angular position, said feed control means including time delay switching means and a variable resistor for simultaneously adjusting the speed of said motor and the time constant of said time delay switching means to secure fine increments, low-feed rates and coarse increments high-feed rates.

6. In a control system for a planer, in combination, an electric feed motor having an armature, a source of electrical energy for the control system, a cutting tool, means for connecting said feed motor to the source of energy and the tool to the motor armature, and feed control means adapted to disconnect the tool from the motor armature when the motor has assumed a predetermined angular positive relative to its initial angular position, said feed control means including time delay switching means and a variable resistor for simultaneously adjusting the speed of said motor and the time constant of said time delay switching means to secure fine increments low-feed rates and coarse increments high-feed rates, together with a regulator for maintaining a constant acceleration rate of said motor irrespective of the amount of load on said cutting tool.

7. In a control system for a planer, in combination with a source of electrical energy, a Ward-Leonard system including a driving motor, a direct-current generator mechanically coupled thereto and a feed motor energized by the generator, said driving motor, generator and feed motor each including an armature and field winding, a regulator including an armature which is coupled to said generator, a differential field winding and a pair of split shunt and differential field windings; the generator and feed motor armatures and the regulator series and differential field windings being in circuit relationship, a cutting tool, a pair of clutches interposed between the feed motor armature and said cutting tool, a selector switch for preselecting four different circuits for predetermining whether the tool feed shall be in the "up," "down," "in" or "out" direction, a pair of reversing relays, one of which is energizable in either the "down" or "in" position of the selector switch and the other of which is energizable in either the "up" or "out" position of the selector switch, one of said reversing relays being effective to complete a circuit and allow passage of current through said regulator and generator shunt field windings and said regulator armature in one direction, the other of said relays being effective to complete another circuit to allow passage of current through the same elements as effected by the first relay, except in an opposite direction, thereby maintaining the acceleration rate of said feed motor constant irrespective of any change in load of said cutting tool.

8. In a control system for a planer, in combination with a source of electrical energy, a Ward-Leonard system including a driving motor, a direct-current generator mechanically coupled thereto and a feed motor energized by the generator, said driving motor, generator and feed motor each including an armature and field winding, a regulator including an armature which is coupled to said geenrator, a differential field winding and a pair of split shunt and differential field windings; the generator and feed motor armatures and the regulator series and differential field windings being in circuit relationship, a cutting tool, a pair of clutches interposed between the feed motor armature and said cutting tool, a selector switch for preselecting four different circuits for predetermining whether the tool feed shall be in the "up," down," "in" or "out" direction, a pair of reversing relays, one of which is energizable in either the "down" or "in" position of the selector switch and the other of which is energizable in either the "up" or "out" position of the selector switch, a time delay relay, one of said reversing relays being effective to complete a circuit and allow passage of current through said time delay relay and said regulator and generator shunt field windings and said regulator armature in one direction, the other of said relays being effective to complete another circuit to allow passage of current through the same elements as effected by the first relay, except in an opposite direction, thereby maintaining the acceleration rate of said feed motor constant irrespective of any change in load of said cutting tool.

9. In a control system for a planer, in combination with a source of electrical energy, a Ward-Leonard system including a driving motor, a direct-current generator mechanically coupled thereto and a feed motor energized by the generator, said driving motor, generator and feed motor each including an armature and field winding, a regulator including an armature which is coupled to said generator, a differential field and a pair of split shunt and differential field windings; the generator and feed motor armatures and the regulator series and differential field windings being in circuit relationship, a cutting tool, a pair of clutches interposed between the feed motor armature and said cutting tool, a selector switch for preselecting four different circuits for predetermining whether the tool feed shall be in the "up," "down," "in" and "out" direction, a pair of reversing relays, one of which is energizable in either the "down" or "in" position of the selector switch and the other of which is energizable in either the "up" or "out" position of the selector switch, a time delay including a variable resistor for changing its time constant, one of said reversing relays being effective to complete the circuit and allow passage of current through said time delay resistor regulator and generator shunt field windings, and said regulator armature in one direction, the other of said relays being effective to complete another circuit to allow passage of current through the same elements as effected by the first relay, except in an opposite direction, thereby maintaining the acceleration rate of said feed motor constant irrespective of any change in load of said cutting tool, said time delay resistor being also effective to change the field strength of the generator and regulator shunt field windings, hence to change the speed of said feed motor.

10. In a control system for a planer, in combination with a source of electrical energy, a Ward-Leonard system including a driving motor, a direct-current generator mechanically coupled thereto and a feed motor energized by the generator, said driving motor, generator and feed motor each including an armature and field winding, a regulator including an armature which is coupled to said generator, a differential field winding and a pair of split shunt and differential field windings; the generator and feed motor armatures and the regulator series and differential field windings being in circuit relationship, a cutting tool, a pair of clutches interposed between the feed motor armature and said cutting tool, a selector switch for preselecting four different circuits for predetermining whether the tool feed shall be in the "up," "down," "in" or "out" direction, a pair of reversing relays, one of which is energizable in either the "down" or "in" position of the selector switch and the other of which is energizable in either the "up" or "out" position of the selector switch, a time delay including a variable resistor for changing its time constant, one of said reversing relays being effective to complete a circuit and allow passage of current through said time delay resistor regulator and generator shunt field windings and said regulator armature in one direction, the other of said relays being effective to complete another circuit to allow passage of current through the same elements as effected by the first relay, except in an opposite direction, thereby maintaining the acceleration rate of said feed motor constant irrespective of any change in load of said cutting tool, said time delay resistor being also effective to change the field strength of the generator and regulator shunt field windings, hence to change the speed of said feed motor, a pair of limit switches, one of which is operable at the end of the cut stroke and the other being operable at the end of the return stroke of said cutting tool, one of said limit switches being effective to energize said time delay relay and the other being effective to deenergize the same.

11. In combination with a reciprocable planer platen, a cutting tool, means for feeding said cutting tool after each cutting stroke, said means comprising an electric feed motor and a variable time delay means including an electromagnetically operated relay having a variable time element for selectively limiting the amount of rotation of the feed motor, hence the extent of feed of said cutting tool, and regulator generator means for effecting constant acceleration of said feed motor irrespective of the setting of the time delay means.

12. In combination with a reciprocable planer platen, a cutting tool, means for feeding said cutting tool after each cutting stroke, said means comprising an electric feed motor and a variable time delay means for selectively limiting the amount of rotation of the feed motor, hence the extent of feed of said cutting tool, and regulator generator means for effecting constant acceleration of said feed motor irrespective of the setting of the time delay means, and means for simultaneously adjusting both the time constant of the time delay means and the voltage applied to the feed motor.

13. In combination with a reciprocable planer platen, a cutting tool, means for feeding said cutting tool after each cutting stroke, said means comprising an electric feed motor and a variable time delay means for selectively limiting the amount of rotation of the feed motor, hence the extent of feed of said cutting tool, and regulator generator means connected in series with said time delay means and a source of supply potential, said time delay means including an adjusting rheostat which effects simultaneous adjustment of the voltage across said time delay means and the voltage across said regulator generator means, thereby effecting slower operation of the feed motor for smaller values of feed.

14. In combination with a planer platen and a cutting tool having means for effecting relative reciprocating movement, means for automatically feeding said cutting tool after each cutting stroke effected on a work piece supported by said planer platen comprising an electric feed motor and an energizing circuit therefor including a regulator generator means for effecting constant speed operation of said feed motor during each reciprocating stroke and for effecting a constant rate of acceleration at the beginning and each of each reciprocating stroke.

15. In combination with a planer platen and a cutting tool having means for effecting relative reciprocating movement, means for automatically feeding said cutting tool after each cutting stroke effected on a work piece supported by said planer platen comprising an electric feed motor and an energizing circuit therefor including a regulator generator means for effecting constant speed operation of said feed motor during each reciprocating stroke and for effecting a constant rate of acceleration at the beginning and end of each reciprocating stroke, and electrical time delay means whose time constant is variable by means of a rheostat, said time delay means being effective to selectively determine the extent of rotation of said feed motor, hence the amount of feed of the tool relative to the work piece after each cutting stroke.

16. In combination with a planer platen and a cutting tool having means for effecting relative reciprocating movement, means for automatically feeding said cutting tool after each cutting stroke effected on a work piece supported by said planer platen comprising an electric feed motor and an energizing circuit therefor including a regulator generator means for effecting constant speed operation of said feed motor during each reciprocating stroke and for effecting a constant rate of acceleration at the beginning and end of each reciprocating stroke, and electrical time delay means whose time constant is variable by means of a rheostat, said time delay means being effective to selectively determine the extent of rotation of said feed motor, hence the amount of feed of the tool relative to the work piece after each cutting stroke, said electrical time delay means being connected in series relationship with respect to said feed so that adjustment of its rheostat will simultaneously effect both the voltage across the time delay means so as to change its time constant and change the voltage across the generator regulator means so that as higher feeder rates are selected higher maximum attainable speeds of the feed motor are simultaneously obtained.

17. In combination with a planer platen and a cutting tool having means for effecting relative reciprocating movement, means for automatically feeding said cutting tool after each cutting stroke effected on a work piece supported by said planer platen comprising an electric feed motor and an energizing circuit therefor including a regulator generator means for effecting constant speed operation of said feed motor during each reciprocating stroke and for effecting a constant rate of acceleration at the beginning and end of each reciprocating stroke, a Ward-Leonard system for driving said feed motor, said regulator generator means including a pair of split, generator shunt field windings from said Ward-Leonard system, and a pair of regulator shunt field windings, and a pair of resistors, all forming a Wheatstone bridge in which the armature of the regulator forms the neutral leg, one of each of said pairs of windings connected in series relationship forms two legs and the pair of resistors forms the other two legs.

GEORGE E. KING.
WILLIAM F. EAMES.